United States Patent [19]
Horiuchi et al.

[11] Patent Number: 5,325,472
[45] Date of Patent: Jun. 28, 1994

[54] IMAGE DISPLAYING SYSTEM FOR INTERACTIVELY CHANGING THE POSITIONS OF A VIEW VECTOR AND A VIEWPOINT IN A 3-DIMENSIONAL SPACE

[75] Inventors: Kazu Horiuchi, Hirakata; Kenji Nishimura, Sakai; Yoshimori Nakase, Kawachinagano, all of Japan

[73] Assignee: Matsushita Electric Industrial Co., Ltd., Osaka, Japan

[21] Appl. No.: 684,389

[22] Filed: Apr. 12, 1991

[30] Foreign Application Priority Data

Apr. 13, 1990 [JP] Japan ................................ 2-97968
Apr. 16, 1990 [JP] Japan ................................ 2-100020

[51] Int. Cl.$^5$ ............................................ G06F 15/62
[52] U.S. Cl. ................................ 395/127; 395/119; 395/125
[58] Field of Search ............... 395/119, 120, 125-127, 395/129-132, 164

[56] References Cited

U.S. PATENT DOCUMENTS 4,734,690 3/1988 Waller ........................... 395/127

FOREIGN PATENT DOCUMENTS

0168981A3 1/1986 European Pat. Off. ...... G06F 15/72

OTHER PUBLICATIONS

"SemNet: Three-Dimensional Graphic Representations of Large Knowledge Bases", Fairchild et al., pp. 201-233 (1988).

Primary Examiner—Heather R. Herndon
Assistant Examiner—Almis Jankus
Attorney, Agent, or Firm—Wenderoth, Lind & Ponack

[57] ABSTRACT

An image displaying system interactively changes the positions of the view vector and the viewpoint in the 3-dimensional space of a camera model which displays an object geometric model, constructed within a computer, on the screen in the computer assisted design (CAD) and science art simulation field. The user inputs the object point and the target point on the display screen showing the viewpoint and the view vector direction so as to effect the screen display of the scene with the positions of the view vector and the viewpoint in the 3-dimensional space of the camera model for displaying on the screen the object geometric model constructed within the computer. The scene with the viewpoint and the view vector direction being interactively changed is displayed on the screen.

4 Claims, 10 Drawing Sheets

IMAGE DISPLAYING SYSTEM FOR INTERACTIVELY CHANGING THE POSITIONS OF A VIEW VECTOR AND A VIEWPOINT IN A 3-DIMENSIONAL SPACE

BACKGROUND OF THE INVENTION

The present invention relates to an image displaying system for interactively changing the positions of a view vector and a viewpoint in a 3-dimensional space of a camera model which displays, objects on a screen of a geometric model constructed within a computer in the computer assisted design (CAD) and science art simulation field.

In recent years, image displaying systems have been used in various designs and simulations as a tool for visualizing phenomena that are difficult to express by text and numerical values using a realistic screen display so as to effect communication between a computer and a human being.

Figure 12:
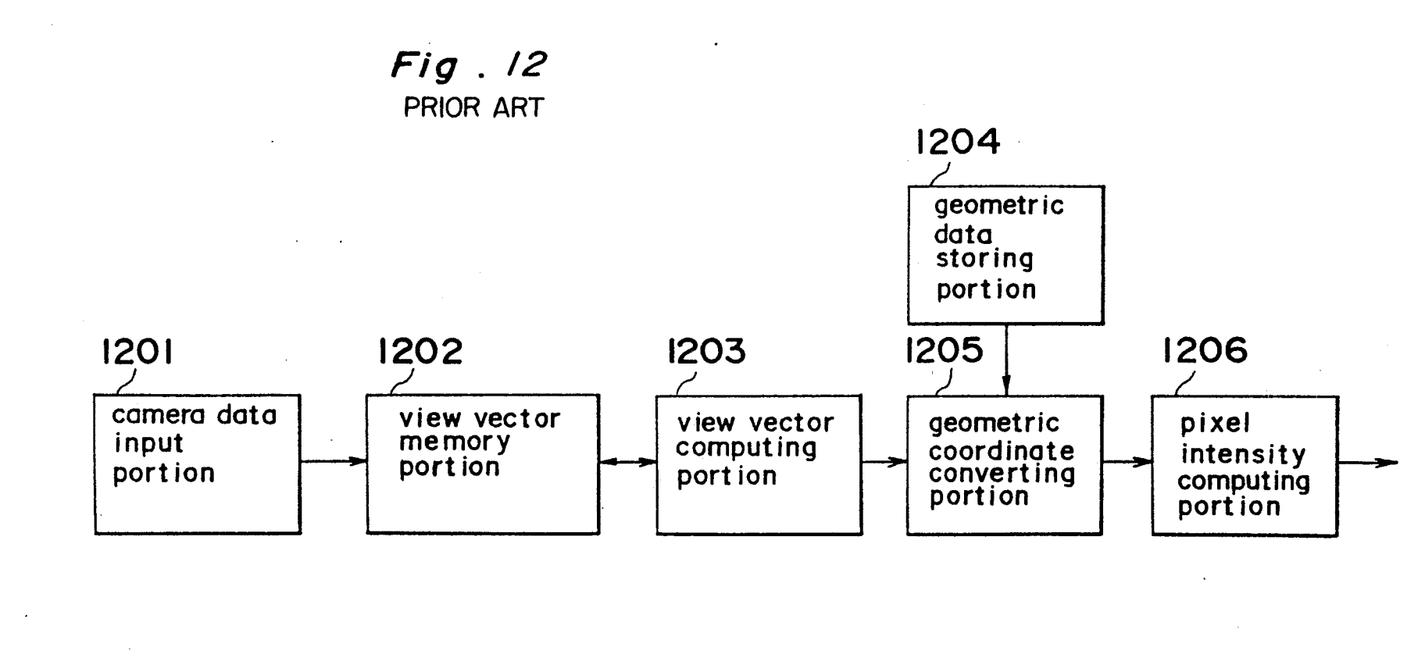
FIG. 12 is a schematic view of the conventional image displaying system.

One example of the above described conventional image displaying system is described hereinafter with reference to the drawings. FIG. 12 is one example of a conventional screen displaying system. Referring to FIG. 12, a camera data inputting portion 1201 is adapted to input 3-dimensional data indicating the amount of displacement of viewpoint and a view vector direction, and is composed of a keyboard. In FIG. 12, a view vector memory portion 1202 is adapted to store the 3-dimensional information of a view vector and is composed of read-write memories. A view vector computing portion 1203 is adapted to compute the 3-dimensional data of a new view vector from the amount of displacement amount of the view vector which has been inputted by the camera data inputting portion 1201. A geometric data storing portion 1204 is adapted to store the 3-dimensional object data of a geometric model and is composed of read-write memories. A geometric coordinate converting portion 1205 is adapted to apply a coordinate conversion to the 3-dimensional object data of the geometric model read from the geometric data storing portion 1204 using the 3-dimensional data of the new view vector computed from the view vector computing portion 1203. A pixel intensity computing portion 1206 is adapted to compute a pixel intensity of each pixel on a display screen from the 3-dimensional data obtained from the geometric coordinate conversion portion.

The operating of the image displaying system constructed as described hereinabove is described hereinafter.

The 3-dimensional form data of objects which becomes objects to be displayed on the screen is stored in the geometric data storing portion 1204. The 3-dimensional value of each vertex of the sets of polygons representing the object surface, for example, is stored as 3-dimensional geometric data.

Stored geometric data is subjected to a coordinate conversion in the geometric coordinate converting portion 1205 using the view vector defined by the 3-dimensional data representing the viewpoint and the direction, and visualized on the display screen in accordance with the brightness computed in the pixel intensity computing portion 1206.

As the 3-dimensional data representing the viewpoints, there are 3-dimensional values (x, y, z) in, for example, a world coordinate system. As the 3-dimensional data representing the direction of the view vector, there are the 3-dimensional, coordinates (X, Y, Z) in numerical values of the target point in, for example, the world coordinate system, and the angle data $(\theta, \phi)$ composed of horizontal angle data in the xz plane of the world coordinate system and vertical angle data formed with the xz plane and the y axis.

In order to change the position of the viewpoint, the 3-,dimensional numerical values (x', y', z') of the new viewpoint are inputted in the camera data input portion 1201, and are stored in the view vector memory portion 1202.

In order to change the view vector direction, the data of the 3-dimensional amount of displacement of the view vector direction is inputted in numerical values to the camera data inputting portion 1201. As the 3-dimensional displacement amount, there is the displacement amount data $(\Delta\theta, \Delta\phi)$ expressed in the, for example, the change $\Delta\phi$ in horizontal angles, and the change $\Delta\phi$ in the vertical angles, in the world coordinate system.

In order to change the viewpoint in the view vector computing portion 1203, a new view vector is computed with the new viewpoint coordinates (x', y', z') read as the 3-dimensional data representing the new viewpoint from the view vector memory portion 1202 and the target points (X, Y, Z).

In order to change the view vector direction, the components of the angle data of the displacement amount data $(\Delta\theta, \Delta\phi)$ are read as the 3-dimensional data representing the new view vector direction from the view vector memory portion 1202 to each angle data component of the angle data $(\theta, \phi)$ read as the 3-dimensional data representing the existing view vector direction from the view vector memory portion 1202 so as to compute. The new view vector to be expressed by the new view vector direction data $(\theta+\Delta\theta, \phi+\Delta\phi)$ obtained by the addition thereof.

In the geometric coordinate converting portion 1205, the 3-dimensional geometric data is subjected to a coordinate conversion using the new view vector computed in the view vector computing portion 1203. As the coordinate conversion, there are, for example, the conversion into the viewpoint coordinate system with the viewpoint being an origin through the world coordinate system from the geometric data definition coordinate system, and the perspective conversion.

Finally, the object data within a frustum is determined from the 3-dimensional geometric data which has been coordinate converted in the geometric coordinate converting portion 1205 and from data from the pixel intensity computing portion 1206 so as to compute the brightness for each pixel of the display screen from the light source and the 3-dimensional data obtained from the geometric coordinate converting portion. As a method of determining the object data within the frustum, there are, for example, hidden vector processing and hidden screen processing.

In order to change the view vector direction and the viewpoint in the above described construction, the user himself if is always required to input the 3-dimensional positions of the viewpoint, the target point, and the view vector direction in the displacement amount with the numerical values, considering the 3-dimensional space within the computer system where the position of the viewpoint and the view vector direction to be defined so as to display the described scene. Thus, there are problems in that the desired scene cannot be displayed unless trial and error are repeated, and there are problems in that it is difficult to predict the view vector in the animation display in the specified frames inserted among the key frames.

SUMMARY OF THE INVENTION

Accordingly, the present invention has been developed with a view to substantially eliminate the above discussed drawbacks inherent in the prior art, and has for its essential object to provide an improved image displaying system.

Another important object of the present invention is to provide an improved image displaying system for interactively changing the view vector direction of the camera model and the viewpoint of the camera model for displaying the objects of the geometric model on the screen.

In accomplishing these and other objects, according to one preferred embodiment of the present invention, there is provided a picture displaying system which includes a view vector memory portion for maintaining view vector information in 3-dimensional space; a geometric data storing portion for maintaining geometric data of the display objects; an interpolated position computing portion which produces in the 2-dimensional sample target points by sampling the curve interpolated from the points inputted from the screen position inputting portion; a viewpoint position computing portion which computes the intersection of geometric data read from the geometric data storing portion with the ray originating at the existing viewpoint read from the view vector memory portion and for passing through the object point inputted from the screen position inputting portion so as to store the intersection in the view vector memory portion as the 3-dimensional position of the new viewpoint; a view vector direction computing portion which computes the 3-dimensional angle data indicating the new view vector direction from the existing screen base position on the display screen indicating the existing view vector direction, the sample target point produced by the interpolated position computing portion, the 3-dimensional position of the viewpoint read from the view vector memory portion, and the 3-dimensional angle data indicating the existing view vector read from the view vector memory portion, so as to store the 3-dimensional angle data indicating the new view vector in the view vector memory portion as the new screen base position.

According to the present invention, the object point corresponding to the new viewpoint and the target point indicating the new view vector direction are inputted as the 2-dimensional position on the display screen by the above described construction, so that the scene with the new view vector and the new viewpoint in the 3-dimension space, of the camera model for making the objects of the geometric model, is displayed on the screen.

The scenes are continuously displayed in accordance with the new view vector directions computed from a plurality of sample target points with the interpolated curve of a plurality of target points on the display screen.

BRIEF DESCRIPTION OF THE DRAWINGS.

These and other objects and features of the present invention will become apparent from the following description taken in conjunction with the preferred embodiment thereof with reference to the accompanying drawings, in which.

DETAILED DESCRIPTION OF THE INVENTION

Before the description of the present invention proceeds, it is to be noted that like parts are designated by like reference numerals throughout the accompanying drawings.

An image displaying system in one embodiment of the present invention will be described hereinafter with reference to the drawings.

Figure 1:
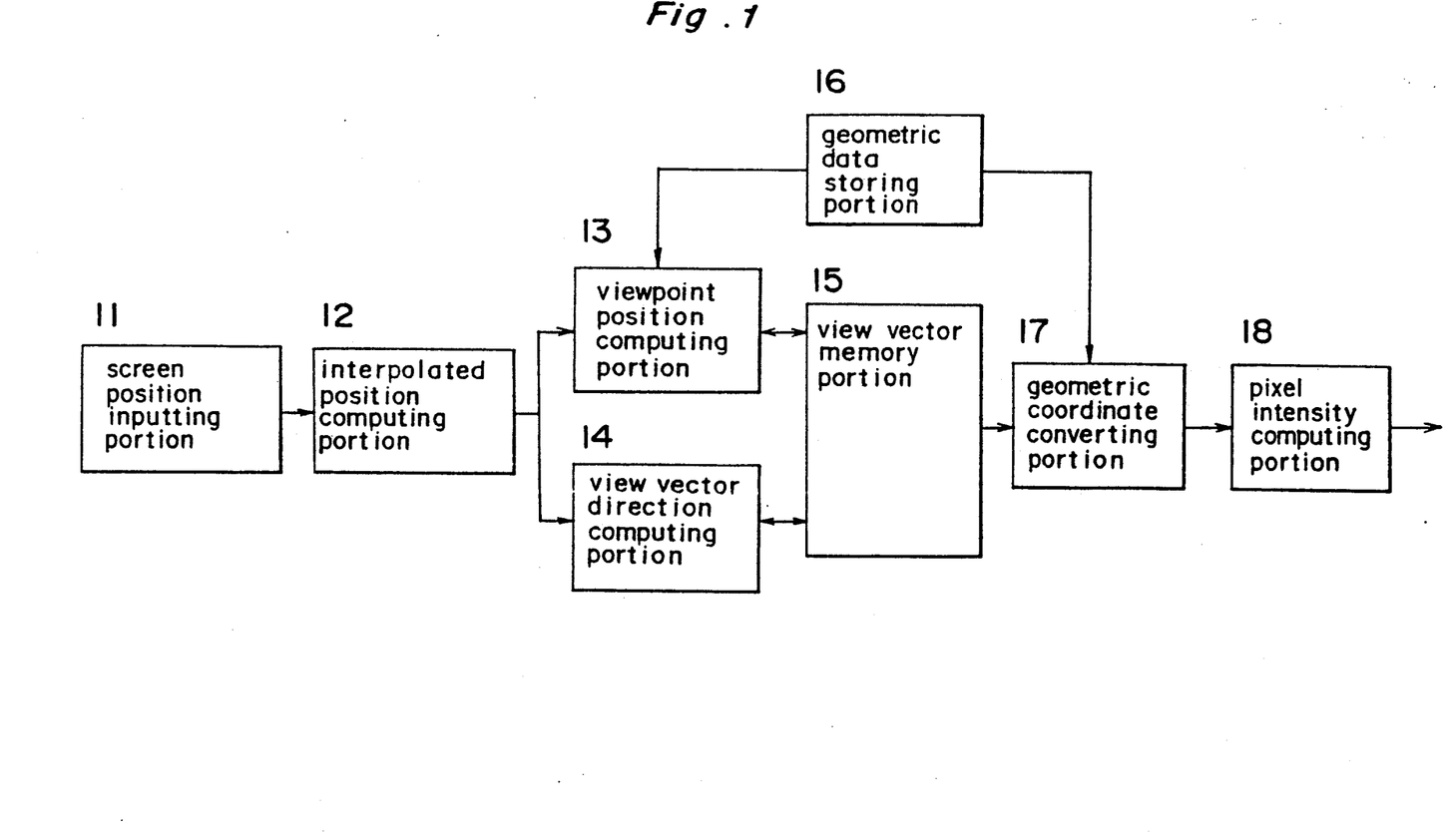
FIG. 1 is a block diagram of an image displaying system in accordance with first and second embodiments of the present invention.

FIG. 1 shows a block diagram of an image displaying system in accordance with an embodiment of the present invention. In FIG. 1, element 11 is a screen position inputting portion for inputting a an object point which is a 2-dimensional position on a display screen corresponding to the new viewpoint, and a target point which is a 2-dimensional position on a display screen indicating a new view vector direction, which is constructed on the display screen for inputting by an input device such as a mouse, a light pen or the like. Element 12 is an interpolated position computing portion for computing a plurality of sample target points on the display screen obtained by sampling the curve interpolated from the points on the display screen corresponding to the continuously changing view vector directions inputted from the screen position inputting portion 11. Element 13 is a viewpoint position computing portion which computes the new viewpoint from the object point on the display screen which are corresponding to the new viewpoint, the existing viewpoint, and the 3-dimensional geometric data of the objects. Element 14 is a view vector direction computing portion which computes the new view vector direction from the target point on the display screen indicating the new view vector direction and the existing viewpoint. Element 15 is a view vector memory portion for maintaining the 3-dimensional information representing the viewpoint and the view vector direction, which is composed of read-write memories. Element 16 is a geometric data storing portion for maintaining the 3-dimensional object data of the geometric model, which is composed of read-write memories. Element 17 is a geometric coordinate converting portion which applys a coordinate conversion on the 3-dimensional object data of the geometric model read from the geometric data storing portion 16 in accordance with the 3-dimensional data of the new viewpoint read from the view vector memory portion 15. Element 18 is a pixel intensity computing portion which computes the pixel intensity of each pixel on the display screen from the light source and the 3-dimensional data obtained from the geometric coordinate converting portion.

In the image displaying system of the present embodiment, the object geometric model to be maintained on the geometric data storing portion 16 is composed of sets of polygons; the 3-dimensional geometric data of each polygon is represented by the vertical coordinate in the world coordinate system.

In the geometric coordinate converting portion 17, the coordinate conversion onto the viewpoint coordinate system with the viewpoint being an origin from the world coordinate system is effected upon the 3-dimensional geometric data; a perspective conversion, which is a means of converting the 3-dimensional data onto the 2-dimensional data on the display screen is effected using the viewpoint and the plane (hereinafter referred to as a virtual screen) with the view vector being a normal vector. The view vector is represented in the world coordinate system, with the view vector being defined by a viewpoint and a target point indicating the view vector direction.

The viewpoint coordinate system of the virtual screen has as the display data each pixel intensity of the pixel data projected onto the virtual screen computed in the pixel intensity computing portion 18 in a one to one correspondence with the display coordinate system of the display screen.

The operation of the image displaying system composed as described hereinabove is described hereinafter with respect to a change in the viewpoint using FIG. 1 through FIG. 3 and FIG. 7.

Figure 2:
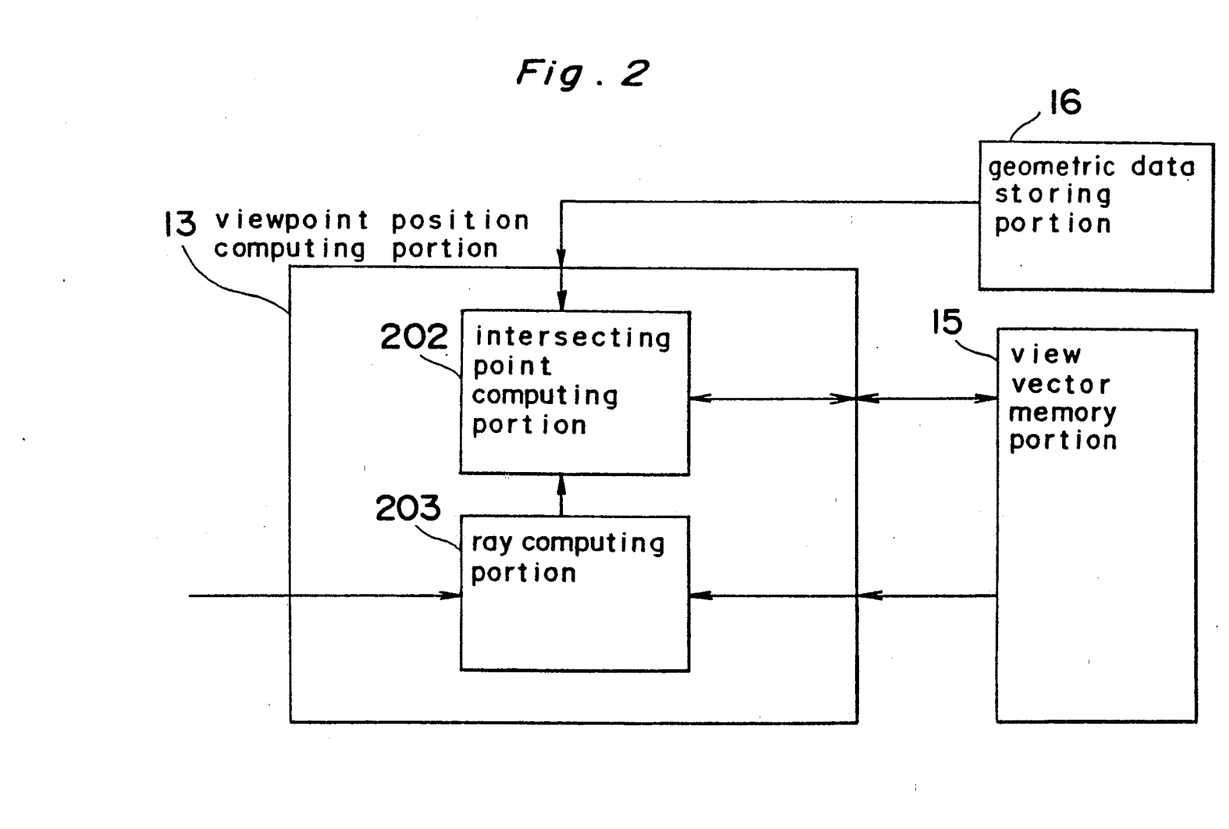
FIG. 2 is an inner block diagram of a viewpoint position computing portion 13 shown in FIG. 1 for illustrating the operation in the first embodiment.

FIG. 2 shows an internal block diagram of the viewpoint position computing portion 13 of FIG. 1. In FIG. 2, element 13 is a viewpoint position computing portion, element 202 is an intersecting point computing portion, element 203 is a ray computing portion; element 15 is a view vector memory portion, and element 16 is a geometric data storing portion.

Figure 3:
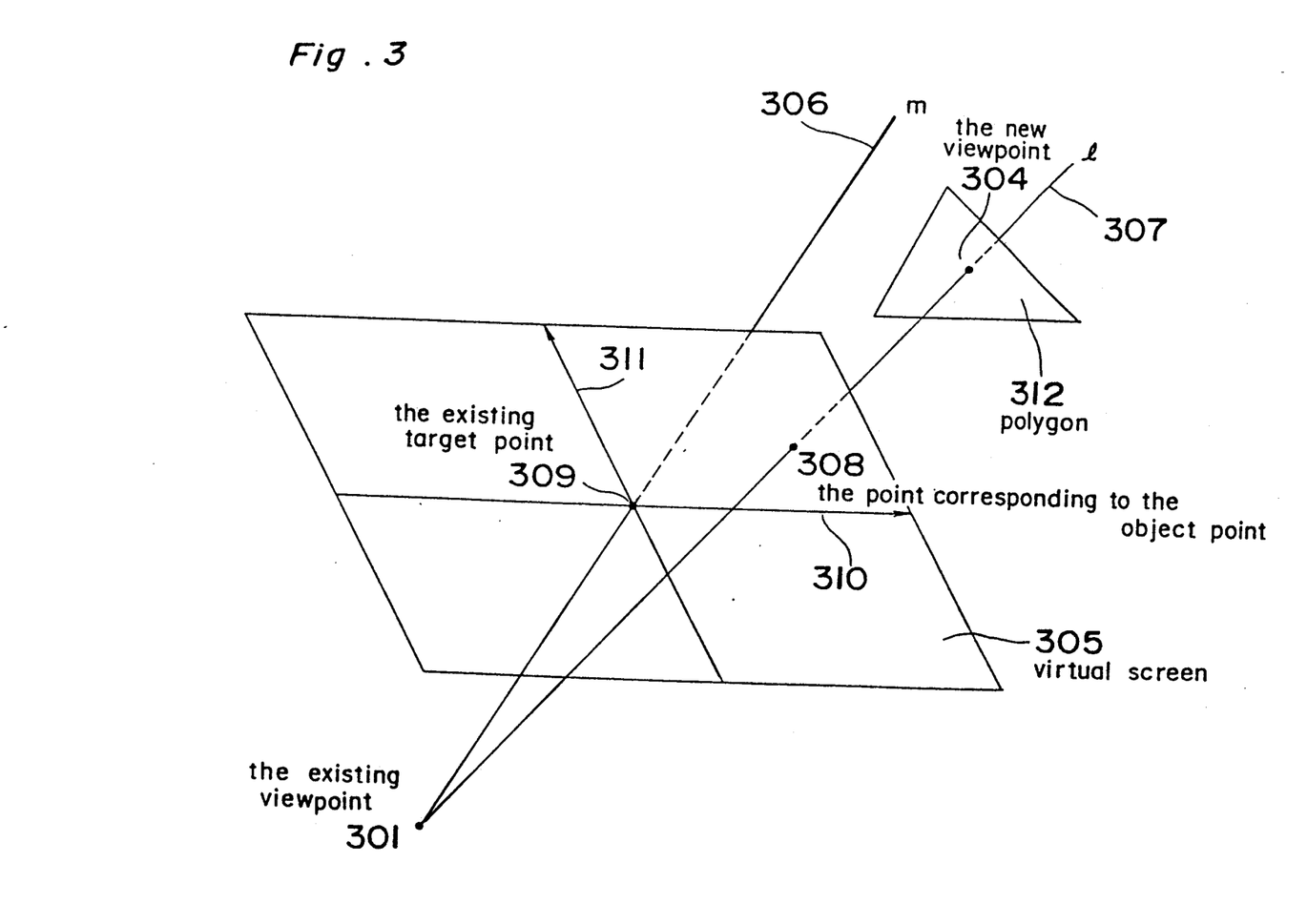
FIG. 3 is a conceptual chart showing the relationship among a viewpoint in the 3-dimensional space, a target point on the virtual screen representing the direction of the view vector, and the object point on the vertical screen representing the moving direction of the viewpoint and the virtual screen for illustrating the operation in the first embodiment.

FIG. 3 is a conceptual chart showing the relationship of the existing viewpoint, the target point on the virtual screen indicating the viewpoint, the object point on the virtual screen corresponding to the new viewpoint, and the virtual screen.

Here the object point on the virtual screen is an intersection of the virtual screen with the ray originating at the existing viewpoint and passing through the object point which is the 2-dimensional position on the display screen inputted from the screen position inputting portion.

The target point on the virtual screen is an intersection of the virtual screen with the ray originating at the existing viewpoint and passing through the existing target point which is in the center of the display screen.

In FIG. 3, element 304 is a new viewpoint; element 305 is a virtual screen expressed by the viewpoint coordinate system; element 306 is a 3-dimensional ray m originating at the existing viewpoint and passing through the existing target point; element 307 is a 3-dimensional ray 1 originating at the existing viewpoint and passing through the object point on the virtual screen; element 308 is an object point on the virtual screen; elements 309, 310, 311 are respectively an origin, a u axis and a v axis of a coordinate system for defining the 2-dimensional coordinate on the virtual screen, and element 309 is the existing target point; element 312 is a polygon including the new viewpoint 304 therein. Also, the virtual screen 305 and the ray m are vertical and the origin (existing target point) 309 is positioned in the center of the virtual screen 305.

Figure 7:
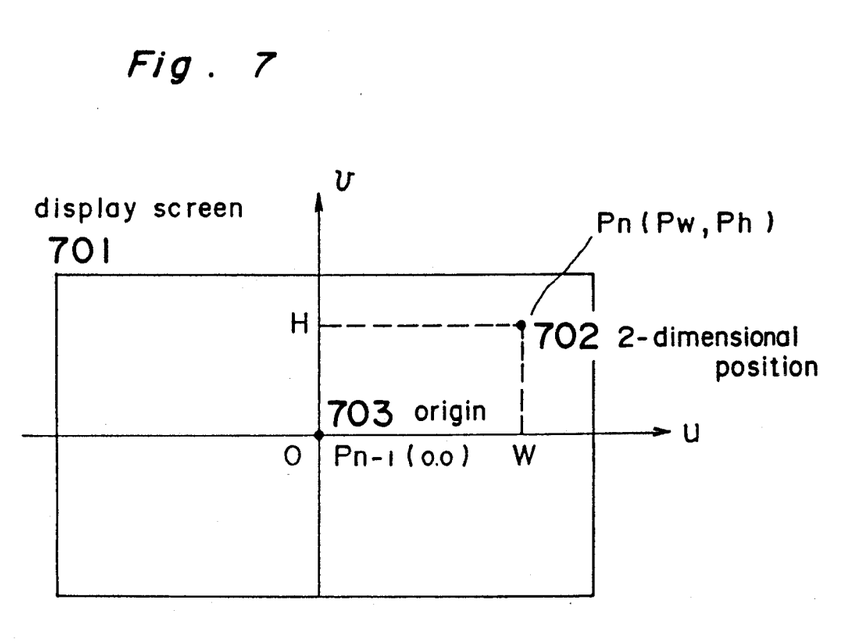
FIG. 7 shows the coordinate system on the display screen for illustrating the operation in the embodiment.

FIG. 7 shows a coordinate system on the display screen. In FIG. 7, element 701 is a display screen with a point 0 being a center of the display screen; element 702 is a 2-dimensional position on the display screen, element 703 is a screen base position provided on the origin 0. The 2-dimensional position 702 is represented by Pn-1 (0,0) using the u-v coordinate system with the point 0 being the origin. Reference characters H and W respectively show the positions of the points (O,Ph) and (Pw,O) in u-v coordinates. In the geometric data storing portion 16, the 3-dimensional coordinate value of each vertex of a set of polygons representing the surfaces of the objects is stored as the 3-dimensional geometric data.

In the view vector memory portion 15, the coordinate value of the existing viewpoint 301 and the coordinate value of the existing target point 309 on the virtual screen, which represent the existing view vector in the world coordinate system, are stored as the 3-dimensional data of the existing view vector.

Here the movement of the viewpoint with respect to the object point is the movement on the 3-dimensional straight line for connecting the existing viewpoint with the object point.

In the screen position inputting portion 11, when the user desires the viewpoint to be changed, the object point 702 on the display screen corresponding to the new viewpoint 304 is inputted with the mouse as the 2-dimensional coordinates (u, v) on the display screen. Here in the 2-dimensional coordinate system on the display screen, the point 703 corresponding to the existing target point is to be the origin, and the u axis is to be parallel to the scanning lines, and the v axis is to be vertical to the scanning lines.

In the ray computing portion 203, the ray 307 with the existing viewpoint 301 in the 3-dimensional space being the origin of the ray is computed from the 3-dimensional coordinate value of the existing viewpoint 301 read from the view vector memory portion 15 and the object point on the virtual screen 308 corresponding to the coordinate values (u, v) of the object point 702 inputted from the screen position inputting portion 11.

In the intersecting point computing portion 202, the intersection of the polygon 312 which is the 3-dimensional geometric data read from the geometric data storing portion 16 and the ray 307 is computed; the intersection in which the distance to the existing viewpoint 301 is minimum is computed from these intersecting points so as to provide the new viewpoint 304.

The new target point is determined so that the new view vector with the new viewpoint being a starting point may become equal to the vector with the existing viewpoint and the existing target point being respectively the starting point and the end, the coordinate values of the new viewpoint 304 and the new target point are stored in the view vector memory portion 15 as the 3-dimensional data of the new view vector.

Further, in the geometric coordinate converting portion 17, the coordinate conversion onto the viewpoint coordinate system with the new viewpoint being the origin from the world coordinate system is applied onto the 3-dimensional coordinate value of each vertex of the set of polygons which is the 3-dimensional geometric data of the object model read from the geometric data storing portion 16 using the 3-dimensional data of the new view vector read from the view vector memory portion 15; thereafter, the perspective conversion is applied using the new view vector and the virtual display screen.

Finally, in the pixel intensity computing portion 18, the objects a frustum are determined by the application of the hidden surface processing upon the 3-dimensional geometric data converted in coordinate by the geometric coordinate converting portion 17 with the brightness of the surface of the object within the frustum corresponding to each pixel on the display screen being made the display brightness.

According to the present embodiment, by the provision of the screen position inputting portion 11 and the viewpoint position computing portion 13, the user can display the scene in accordance with the new view vector with the new viewpoint in accordance with the specified position by the direct specification, on the display screen, of the direction of the viewpoint to be changed.

The operation of a second embodiment of the present invention is described hereinafter with respect to the change in the view vector direction using FIG. 1 and FIG. 4 through FIG. 7. The difference from the first embodiment is in that the interpolated position computing portion 12 and the view vector direction computing portion 14 of FIG. 1 are newly provided. The operation of the image displaying system constructed as hereinabove described is described hereinafter.

Figure 4:
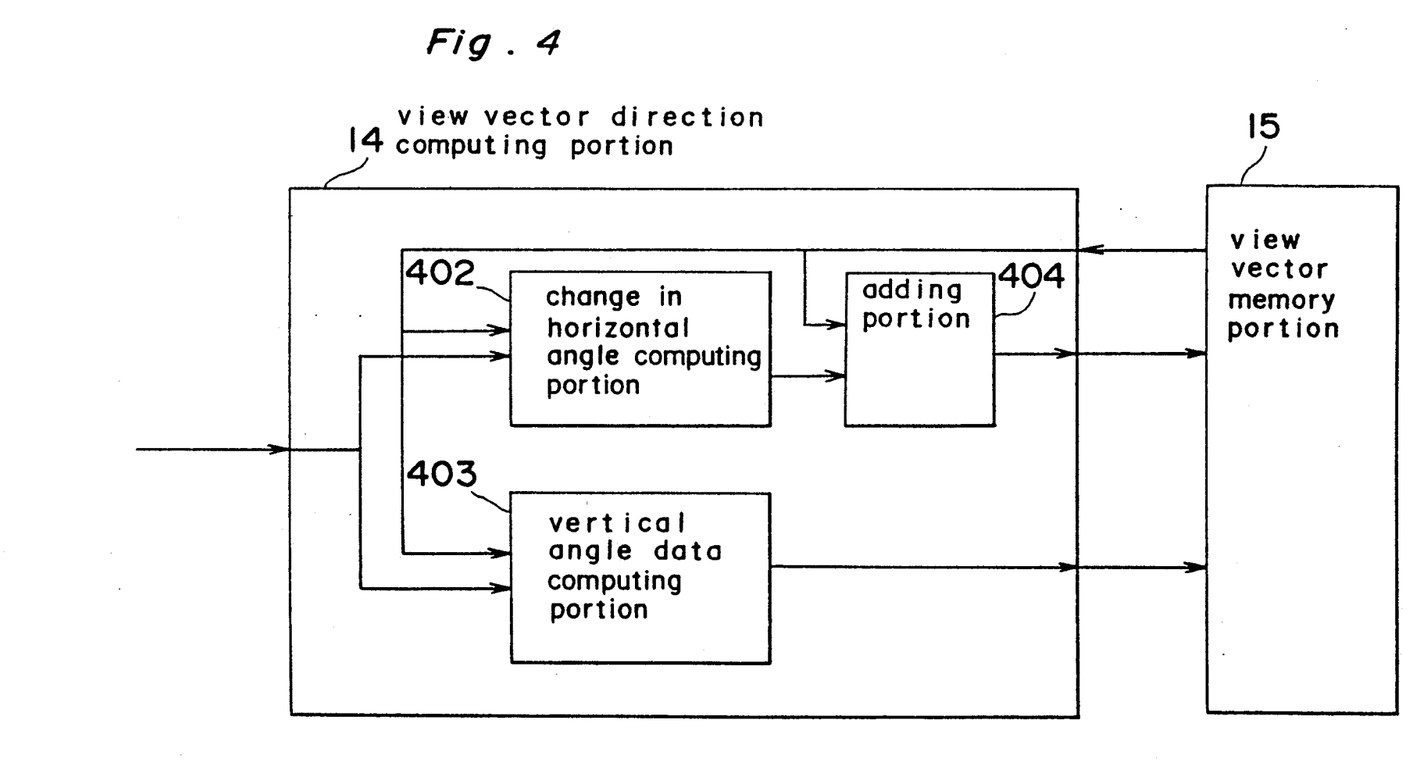
FIG. 4 is an internal block diagram of a view vector direction computing portion 14 shown of FIG. 1 for illustrating the operation in the second embodiment.

FIG. 4 is an internal block diagram of the view vector direction computing portion 14 of FIG. 1. Referring to FIG. 4, element 14 is a view vector direction computing portion; element 402 is a change in horizontal angle computing portion; element 403 is a vertical angle computing portion; element 404 is an adding portion; and element 15 is a view vector memory portion.

Figure 5:
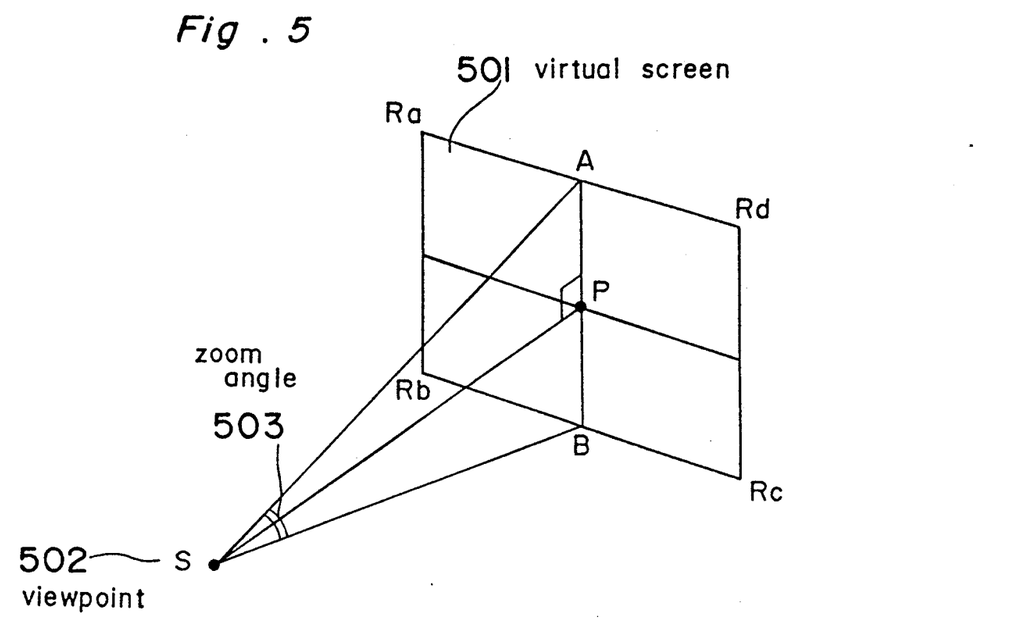
FIG. 5 is a conceptual chart of the viewpoint in the world coordinate system, the virtual screen and the zoom angle for illustrating the operation in the embodiment.

FIG. 5 is a conceptual view of the viewpoint in the world coordinate system, the virtual display screen and the zoom angle. In FIG. 5, element 501 is a virtual screen represent by a rectangle RaRbRcRd, element 502 is a viewpoint S; element 503 is a zoom angle, which is shown as ASB. A point A and a point B are respectively the middle point of a side RaRd and , a side RbRc; line $\overline{SP}$ is the distance between the viewpoint S and the virtual screen RaRbRcRd.

Figure 6:
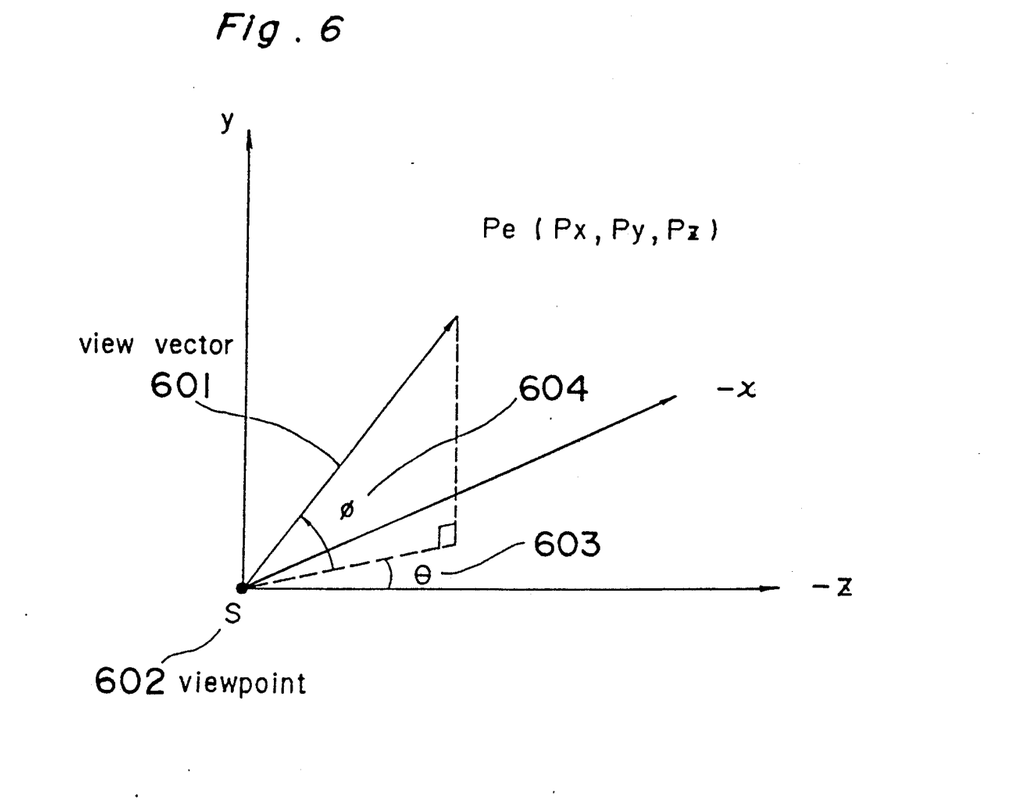
FIG. 6 is a conceptual chart of the components of the angle data of the view vector in the world coordinate system for illustrating the operation in the embodiment.

FIG. 6 is a conceptual view of the horizontal component and the vertical component of the angle data indicating the view vector in the world coordinate system.

In FIG. 6, element 601 is a unit vector SPe of the view vector; element 602 is a view point S; element 603 is a horizontal component $\theta$ of the angle data; and element 604 is a vertical component $\phi$ of the angle data. The view vector is represented by using the horizontal component $\theta$ which is the angle of rotation of the view vector from the $-z$ axis towards the $-x$ axis, and the vertical component $\phi$ composed of xz plane and the view vector. Namely, a first formula through a third formula are established between the SPe($\phi$, $\theta$) and the world coordinate values (Px, Py, Px) of Pe.

$Px = -\cos \phi \sin \theta$          1(first formula)

$Py = \sin \phi$          (second formula)

$Pz = \cos \phi \cos \theta$          (third formula)

Figure 8:
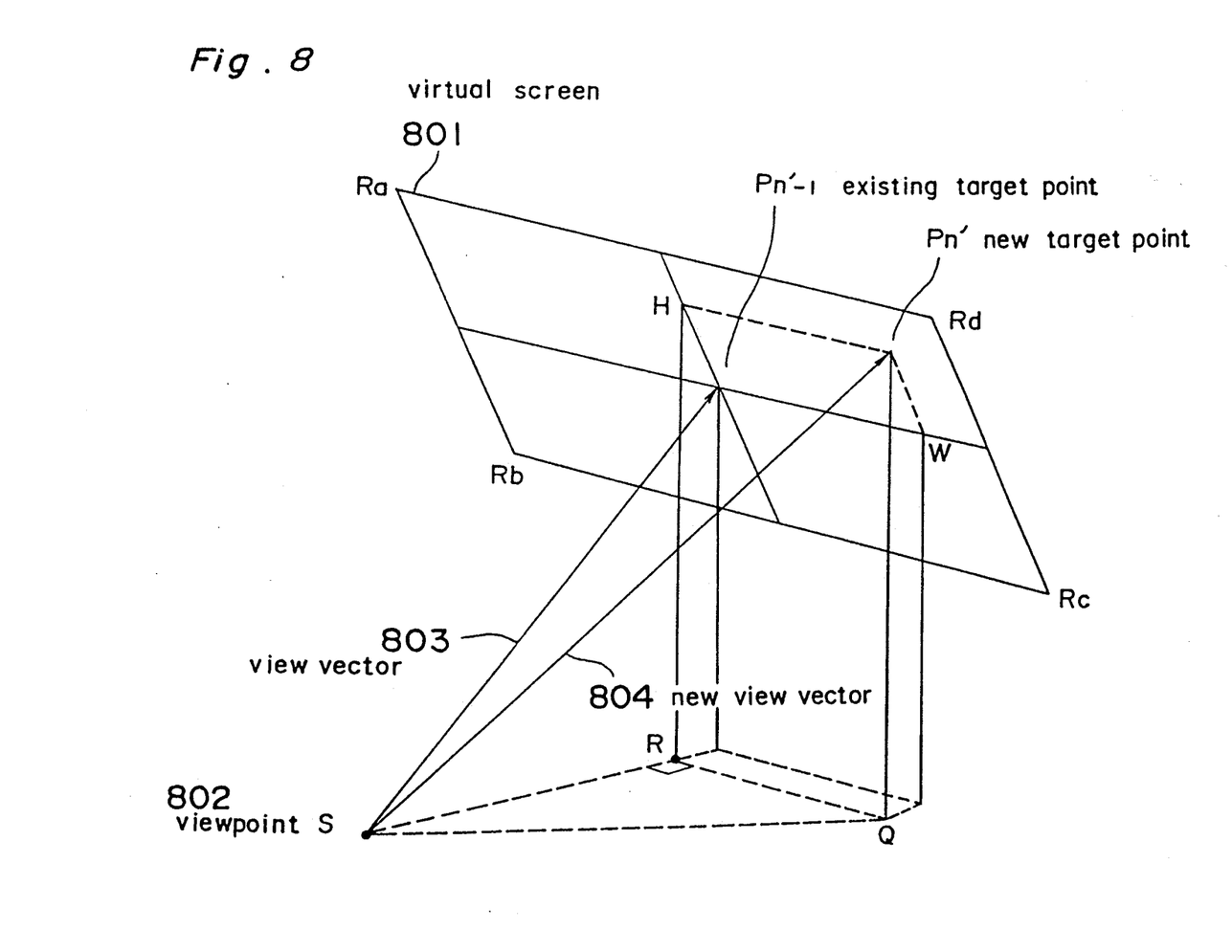
FIG. 8 shows a conceptual chart of the viewpoint and the view vector in the world coordinate system for illustrating the operation in the embodiment.

FIG. 8 is the conceptual view of the viewpoint and the view vector in the world coordinate system. In FIG. 8, element 801 is a virtual scene; element 802 is a viewpoint S; and element 803 is an existing view vector. The definition is given by the viewpoint S and Pn'-1, on the virtual screen 801 corresponding to the existing target point Pn-1 (0, 0) which is the screen base position 703 on the display screen 701, using the vector SPn'-1, ($\theta$n-1, $\phi$n-1) being provided using the angle components in the world coordinate system. Element 804 is a new view vector. The definition is given with the viewpoint S and the new target point Pn' on the virtual screen 801 corresponding to the point Pn(Pw, Ph) which is the new target point 702 on the display screen 701, the vector SPn' ($\theta$n, $\phi$n) being provided using the angle components in the world coordinate system.

The side RaRd and a side RbRc for forming the virtual screen 801 are parallel to the xz plane in the world coordinate system; points R and Q respectively represent the foot points of the vertical lines lowered from the points H and Pn, onto a plane which is parallel to the xz plane and includes the viewpoint S.

Figure 9:
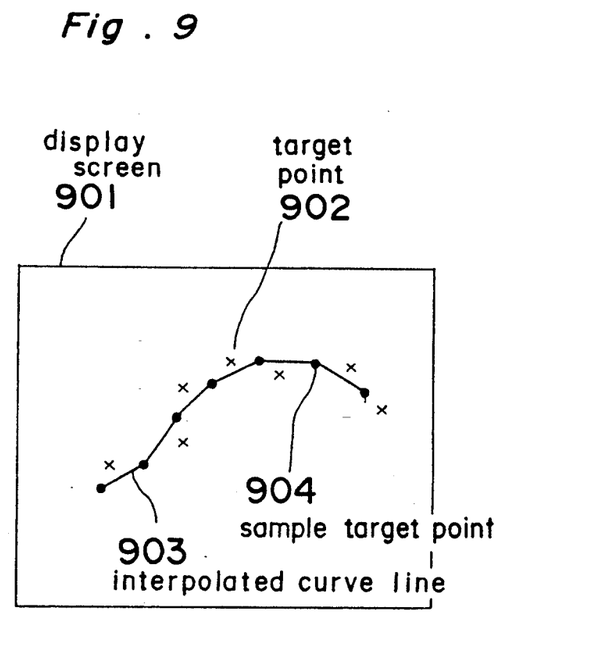
FIG. 9 is a conceptual chart of the sample positions of the interpolated curve and the target point on the display screen for illustrating the operation in the embodiment.

FIG. 9 is the conceptual view of the interpolated curve lines on the display screen and the sample position. Referring to FIG. 9, element 901 is a display screen; element 902 is a target point specified on the display screen 901; element 903 is an interpolated curved line; element 904 is a sample target point. The operation of the image displaying system as described hereinabove is described hereinafter with reference to FIG. 1 and FIG. 4 through FIG. 11.

In the geometric data storing portion 16, the 3-dimensional coordinate value of each vertex of a set of polygons representing the surfaces of the objects is stored as the 3-dimensional geometric data.

In the view vector memory portion 15, the 3-dimensional coordinate value in the world coordinate system of the viewpoint S and the angle data ($\theta$n-1, $\phi$n-1) indicating the existing view vector are stored as the 3-dimensional data of the existing view vector.

In the screen portion inputting portion 11 are a plurality of the target points 902 which are the 2-dimensional positions on the display represented in the u-v coordinate.

In the interpolated position computing portion 12, the sample target points 904 on the display screen are produced by sampling the interpolated curved line 903 on a display screen 901 which is computed by the spline interpolation using the 3-dimensional spline function obtained with each u coordinate value as a sample point, and the v coordinate value as a sample value, of a plurality of target points 902 inputted to the display screen in the screen portion inputting portion 11.

With respect to the change in the horizontal angle computing portion 402 within the view vector direction computing portion 14, a method of computing the new view vector with the new direction computed from the sample target point on the display screen obtained from the interpolated position computing portion 12 is described hereinafter.

In the change in horizontal angle computing portion 402, the change in horizontal component $\Delta\theta$ of the angle data indicating the new view vector SPn' is computed by a fourth formula using the coordinate value Pn'(Pw', Ph') on the virtual screen 801 corresponding to the u-v coordinate value Pn(Pw, Ph) of the 2-dimensional position 702 on the display screen 701 obtained from the interpolated position computing portion 12. Here in the fourth formula d1 represents SR of FIG. 8, and is obtained from a fifth formula using of the existing view vector SPn'-1($\theta$n−1, $\phi$n−1) read from the view vector memory portion 15, the distance SP'n−1 between the viewpoint 802 and the virtual screen 801.

$$\Delta\theta = \tan^{-1}(Pw'/d1) \quad \text{(fourth formula)}$$

$$d1 = SP'n-1 \cos(\theta-1) - Ph'\sin(\phi n-1) \quad \text{(fifth formula)}$$

In the adding portion 404, the $\Delta\theta$ computed by the change in horizontal angle computing portion 402 is added to the horizontal component $\theta$n-1 of the angle data indicating the existing view vector SP'n-1,($\theta$n-1, $\phi$n-1) read from the view vector memory portion 15 so as to compute the horizontal component $\theta$n of the angle data indicating the new view vector SPn'.

In the vertical angle computing portion 403, the vertical component $\phi$n of the angle data indicating the new vector SPn' is computed by a sixth formula. Here in the sixth formula, d2 and d3 respectively represent sin ($\phi$) Pn'Q and SQ of FIG. 8, which are obtained from a seventh formula and an eighth formula using the position Pn'(Pw', Ph') on the virtual screen 801. The d1 computed in the change in horizontal angle computing portion 402, the existing view vector SP'n-1,($\theta$n-1, $\phi$n-1) read from the view vector memory portion 15, and the distance SP'n-1 between the viewpoint 802 and the virtual screen 801. If the above described sin ($\phi$) is greater than or equal to 0, it represents a positive sin (+). If the above described sign ($\phi$) is less than or equal to 0, it represents a negative sign (−).

$$\phi n = \tan^{-1}(d2/d3) \quad \text{(sixth formula)}$$

$$d2 = \sqrt{SP'n-1} \; \sin(\phi n - 1) + Ph'\cos(\phi n - 1) \quad \text{(seventh formula)}$$

$$d3 = \sqrt{d1^2 + Pw^2} \quad \text{(eighth formula)}$$

The horizontal component $\theta$n and the vertical angle component $\phi$n of the angle data indicating the new view vector computed by the above described method are stored in the view vector memory portion 15.

The above description is a new view vector direction computing method in the view vector direction computing portion 14.

In the geometric coordinate converting portion 17, the coordinate conversion into the viewpoint coordinate system with the new viewpoint being the origin from the world coordinate system is applied onto the 3-dimensional coordinate value of each vertex of the set of polygons which is the 3-dimensional geometric data of the object model read from the geometric data storing portion 16 using the 3-dimensional data of the new view vector read from the view vector memory potion 15; thereafter the perspective conversion is applied using the new view vector and the virtual display screen.

Finally, in the pixel intensity computing portion 18, the objects within the frustum are determined by the application of hidden surface processing upon the 3-dimensional geometric data converted in coordinate by the geometric coordinate converting portion 17 with the brightness of the surface of the object within the frustum corresponding to each pixel on the display screen being made the display brightness.

Figure 10:
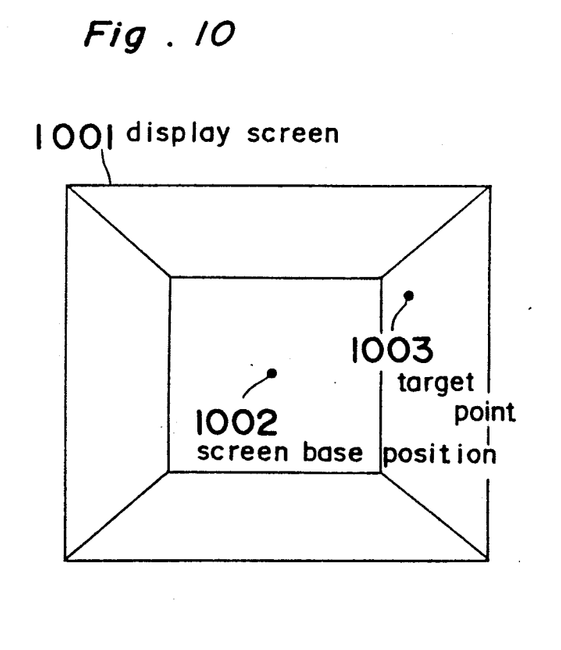
FIG. 10 is a display screen in accordance with the existing view vector direction for illustrating the operation in the embodiment.
Figure 11:
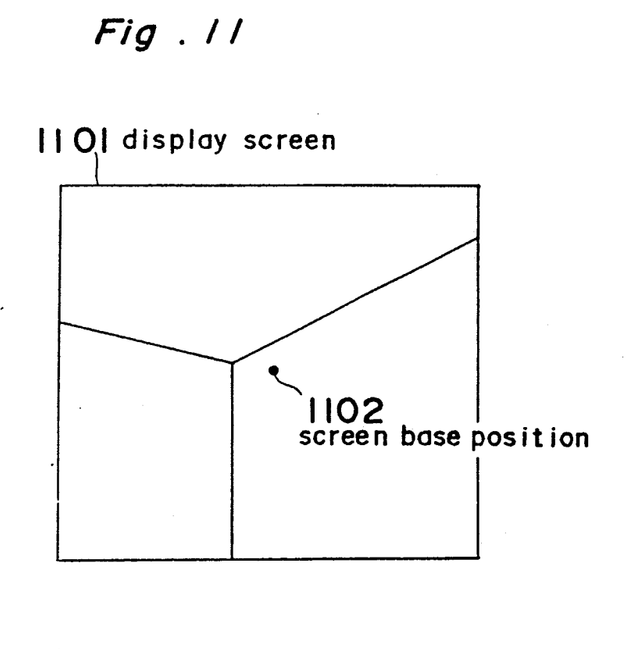
FIG. 11 is a display screen in accordance with the new view vector direction for illustrating the operation in the second embodiment.

The modified embodiments of the display screen are shown in FIG. 10 and FIG. 11 in the changing operation of the view vector direction using the image displaying system of the present embodiment constructed as described hereinabove. FIG. 10 is a display screen in accordance with the existing view vector. FIG. 11 is a display screen in accordance with the new view vector.

In FIG. 10 and FIG. 11, elements 1001 and , 1101 are display screens, elements 1002, 1102 are screen base positions and element 1003 is a target point inputted on the display screen. The image displaying system in the present embodiment displays the new scene on the display screen 1101 changed by moving the target point 1003 directly inputted on the display screen 1001 as a new target point toward the screen base position 1002, on the display screen.

According to the present embodiment, the user can change the view vector direction and the viewpoint direction in accordance with the specified position simply by the direct specification, on the display screen, of the target point representing the desired view vector direction by the provision of the screen position inputting portion 11 and the view vector direction computing portion 14 so as to display the scene in accordance with the new view vector. By the provision of the interpolated position computing portion 12, the direction of the view vector direction on the display screen may be easily predicted in the animation displaying operation in the specified frames inserted among the key frames, so that the screen may be continuously displayed in accordance with the desired view vector direction.

In a first embodiment, the new viewpoint is an intersection of the geometric data with the ray, it may be another point on the ray.

In the same embodiment, the 3-dimensional geometric data is a 3-dimensional coordinate value of each vertex of the set of polygons representing the object surface, with the polygons being optionally curved surfaces.

In the same embodiment, an object point inputted from the screen position inputting portion is a 2-dimensional coordinate value of a point corresponding to a new viewpoint, and may be a new target point.

In the second embodiment, the screen base position is provided at the center of the display screen; it may also be provided at any free position on the display screen.

In the same embodiment, the 3-dimensional spline interpolation is used as the interpolating method applied in the interpolated position computing portion 12; the other polynomial interpolations, and other interpolating methods using a rational expression, trigonometric function and the other functions may be used.

Also, in the same embodiment, the sample target points are positions having the u coordinate at equal intervals on the interpolating curve, but may be other points on the interpolating curve line.

As is clear from the foregoing description, in the arrangement of the present invention, which includes a view vector memory portion for maintaining the view vector information in the 3-dimensional space, a geometric data storing portion for maintaining the geometric data of the display subject objects, an interpolated position computing portion which produces the 2-dimensional sample target points by sampling the curve interpolated from the points inputted from the screen position inputting portion, a viewpoint position computing portion which computes the intersection of geometric data read from the geometric data storing portion with the ray originating at the existing viewpoint read from the view vector memory portion and passing through the object point inputted from the screen position inputting portion so as to store the intersection in the view vector memory portion as the 3-dimensional position of the new viewpoint, a view vector direction computing portion which computes the 3-dimensional angle data indicating the new view vector direction from the existing screen base position on the display screen indicating the existing view vector direction, the sample target point produced by the interpolated position computing portion the 3-dimensional position of the viewpoint read from the view vector memory portion, and the 3-dimensional angle data indicating the existing view vector read from the view vector memory portion, so as to store the 3-dimensional angle data indicating the new view vector in the view vector memory portion as the new screen base position, the user can display the scene in accordance with interactively changing the view vector direction and the viewpoint of the camera model for displaying the objects of the geometric model, constructed within the computer system, on the screen, simply by directly inputting on the display screen the object point corresponding to the desired viewpoint and the target point indicating the desired view vector direction.

Also, in the animation displaying operation in the specified frames inserted among the key frames, the direction of the view vector direction on the display screen may be easily predicted, so that the scenes may be continuously displayed in accordance with the new view vector directions computed from a plurality of sample target points with the interpolated curve of a plurality of target points on the display screen directly specified.

Although the present invention has been fully described by way of example with reference to the accompanying drawings, it is to be noted here that various changes and modifications will be apparent to those skilled in the art. Therefore, unless otherwise such change and modifications depart from the scope of the present invention, they should be construed as being included therein.

WHAT IS CLAIMED IS:

1. An image displaying system comprising:
   a geometric data memory for storing geometric data of a 3-dimensional object in a 3-dimensional coordinate world space;
   a view vector memory for storing view vector information consisting of viewpoint data which specifies a viewpoint in the world space from which the object can be viewed and viewing direction data which specifies a direction from the viewpoint to a point to be viewed;
   a screen position inputting means for interactively inputting an object point identifying a 2-dimensional position on a display screen;
   a viewpoint position computing which computes an intersection of the geometric data read from the geometric memory with a ray originating at an existing viewpoint defined by the viewpoint data read from the view vector memory and passing through a point in the world space corresponding to the object point, so as to store the intersection in the view vector memory as the viewpoint data of a new viewpoint.

2. An image displaying system comprising:
   a view vector memory for storing view vector information consisting of viewpoint data which specifies a viewpoint in a 3-dimensional coordinate world space from which a 3-dimensional object can be viewed and viewing direction data which specifies a direction from the viewpoint to a point to be viewed;
   a screen position inputting for interactively inputting a target point identifying a 2-dimensional position on a display screen;
   a viewing direction computer which computes 3-dimensional angle data specifying a new direction originating at the viewpoint form the target point inputted from the screen position inputting means, a screen base position indicating a 2-dimensional position on the display screen corresponding to a view reference point, viewpoint data read from the view vector memory, and 3-dimensional angle data indicating the existing viewing direction data read from the view vector memory, so as to store the computed 3-dimensional angle data in the view vector memory as the new viewing direction data.

3. An image displaying system comprising:
   a geometric data memory for storing geometric data of a 3-dimensional object in a 3-dimensional coordinate world space;
   a view vector memory for storing view vector information consisting of viewpoint data which specifies a viewpoint in the world space from which the object can be viewed and viewing direction data which specifies a direction from the viewpoint to a point to be viewed;
   a screen position inputting means for interactively inputting an object point identifying a 2-dimensional position on a display screen and a target point identifying a 2-dimensional position on a display screen;
   a viewpoint position computer which computes an intersection of the geometric data read from the geometric memory with a ray originating at an existing viewpoint defined by the viewpoint data read from the view vector memory and passing through a point in the world space corresponding to the object point, so as to store the intersection in the view vector memory as the viewpoint data of a new viewpoint;

a viewing direction computer which computes 3-dimensional angle data specifying a new direction originating at the viewpoint from the target point inputted from the screen position inputting means, a screen base position indicating a 2-dimensional position on the display screen corresponding to a view reference point, viewpoint data read from the view vector memory, and 3-dimensional angle data indicating the existing viewing direction data read from the view vector memory, so as to store the computed 3-dimensional angle data in the view vector memory as the new viewing direction data.

4. An image displaying system comprising:

a geometric data memory for storing geometric data of a 3-dimensional object in a 3-dimensional coordinate word space;

a view vector memory for storing view vector information consisting of viewpoint data which specifies a viewpoint in the world space from which the object can be viewed and viewing direction data which specifies a direction from the viewpoint to a point to be viewed;

a screen position inputting means for interactively inputting an object point identifying a 2-dimensional position on a display screen and a target point identifying a 2-dimensional position on a display screen;

an interpolated position computer which generates sampled target points identifying 2-dimensional positions on a display screen by sampling a curve interpolated from the target points inputted from the screen position inputting means;

a viewpoint position computer which computes an intersection of the geometric data read from the geometric memory with a ray originating at an existing viewpoint defined by the viewpoint data read from the view vector memory and passing through a point in the world space corresponding to the object point, so as to store the intersection in the view vector memory as the viewpoint data of a new viewpoint;

a viewing direction computer which computes 3-dimensional angle data specifying a new direction originating at the viewpoint from a sampled target point computed by the interpolated position computer, a screen base position indicating a 2-dimensional position on the display screen corresponding to a view reference point, viewpoint data read from the view vector memory, and 3-dimensional angle data indicating the existing viewing direction data read from the view vector memory, so as to store the computed 3-dimensional angle data in the view vector memory as the new viewing direction data.

* * * * *